Patented Nov. 26, 1935

2,021,979

UNITED STATES PATENT OFFICE 2,021,979

PRODUCTION OF RUSTLESS IRON

William Bell Arness, Baltimore, Md., assignor, by mesne assignments, to Rustless Iron Corporation of America, Baltimore, Md., a corporation of Maryland No Drawing. Application July 20, 1933, Serial No. 681,372

6 Claims. (Cl. 75—45)

This invention relates to corrosion resistant irons and steels and more particularly to an art of producing the same.

Among the objects of my invention is the simple, efficient and economical production of rustless irons and steels of a desirable fine grain size and of improved physical characteristics, made to a desired specification of iron, carbon, chromium and nitrogen, either with or without supplementary elements such as nickel, copper, cobalt, titanium, molybdenum, tungsten, vanadium and the like.

The invention accordingly consists in the combination of elements, composition of ingredients and mixture of materials, and in the several steps and the relation of each of the same to one or more of the others as described herein, and the scope of the application of which is indicated in the following claims.

As conducive to a clever understanding of certain features of my invention it may be noted at this point that, as more particularly pointed out in my co-pending application, Serial No. 645,637, entitled Non-corrosive alloy, filed December 3, 1932, many highly beneficial characteristics are given rustless iron and steel by adding to the metal a small percentage of nitrogen. The irons and steels containing nitrogen are of an inherently fine, even, grain structure; they are of improved workability over a wider range of working temperatures; they are less subject to grain growth, brittleness, decarburization and fatigue; and they are more durable and of higher impact values than heretofore known alloys of the class indicated.

One of the outstanding objects of my invention is the efficient, economical and thoroughly practical production of rustless iron and steel, either with or without supplementary additions indicated above, wherein a desired nitrogen content is reliably and economically achieved.

In the practice of my invention a suitable furnace, for example, an electric arc furnace, is charged with desired raw materials, such as rustless iron scrap and/or ordinary low-carbon steel scrap and an oxidizing agent such as iron ore, roll scale or the like. This charge is melted down forming a bath of ferrous metal covered by an oxidizing slag, and then brought to a uniformly high temperature. Chromium additions are made either along with the initial melt down ingredients, using, for example, high carbon ferrochrome or chrome ore, or these additions may be made to the bath and slag formed as indicated above, using chrome ore.

Certain practical advantages, such as savings in power consumption, improved furnace operating conditions, and the like, are gained by making the chromium additions both along with the initial charge of ingredients and to the bath of metal and slag after melt down.

Under the action of the strongly oxidizing slag and the high temperatures employed, carbon coming from the furnace electrodes and furnace atmosphere, as well as from the raw materials, is effectively excluded and/or removed from the bath of ferrous metal. Along with the oxidation of carbon there is an incidental oxidation of chromium from the metal; the chromium oxides formed being transferred into the slag. After complete melt-down of the ingredients to form a ferrous metal bath of low carbon content covered by a slag containing the oxides of iron and chromium is achieved, as indicated above, a suitable reducing agent, such as ferrosilicon, is charged into the furnace to recover iron and chromium from the slag overlying the bath of metal to enable the production of rustless iron in an efficient and economical manner. Along with the reducing agent there is added a desired quantity of basic slag forming materials, such as burnt lime to assure basic conditions during the reduction of the oxides contained in the slag and a consequent minimum attack of the acid constituents formed thereby on the furnace lining.

Under the action of the reducing agent employed the oxides of iron and chromium contained in the slag are reduced and the nascent iron and chromium resulting from this reduction step gravitate from the slag into the underlying bath of metal.

To give finished metal of a desired nitrogen content, the reduction of the oxides of iron and chromium contained in the slag is carried out in the immediate presence of a nitrogen containing gas. For this purpose commercial dry bottled nitrogen may be conveniently employed, the nitrogen being added to the slag by maintaining a nitrogen atmosphere under slight pressure within the furnace during the reduction period or by directly introducing nitrogen gas into the slag at one or more points to assure intimate contact between the nascent metals and the nitrogen gas.

The iron and chromium coming from the slag, in their nascent states, absorb nitrogen and carry this nitrogen either in a free or combined state into the bath of ferrous metal. The nitrogen atmosphere is maintained in and about the slag during the reduction period until a desired quantity of nitrogen gas is added to the bath of metal.

The character and duration of the nitrogen atmosphere, or the amount of nitrogen containing gas and the manner of introducing this gas into the slag in order to achieve a desired nitrogen content in the finished rustless iron are features which are determined empirically.

The heat of metal is refined and finished in accordance with standard practice after which the metal is poured into suitable molds and allowed to cool. The finished metal is of fine even grain structure and may be worked over a wider range of temperatures than heretofore known rustless irons and steels. The metal is less subject to grain growth, brittleness, decarburization and fatigue and is more durable and of higher impact values than alloy irons of the class indicated, all as more particularly pointed out in my copending application referred to above.

As illustrative of the practice of my invention a 6-ton Heroult electric arc furnace, having graphite electrodes and rated three-phase, 25 cycle, 1500 KVA at 110 to 180 volts, is first prepared for the reception of a charge by arcing on electrode butts to heat up the furnace. The furnace is preferably provided with a chromite brick bottom which is carried up to a height somewhat above the slag line of the furnace. For reasons of economy, a lining containing chrome ore is preferably rammed in over the chromite brick hearth lining; sodium silicate being used as a convenient binder. The furnace side walls and roof are conveniently lined with silica brick.

After the preheating, as indicated above, the furnace is, illustratively, charged with 12,600 pounds of rustless iron scrap, analyzing about 17% chromium and about .10% carbon; 3250 pounds of ordinary low-carbon steel scrap; 2850 pounds of chrome ore, analyzing about 48% chromium oxide ($Cr_2O_3$) and about 19% iron oxide (FeO); and 1,000 pounds of roll scale which is substantially 100% magnetic iron oxide.

Electric power is applied to the furnace and the charge of ingredients is rapidly melted down to form a bath of molten iron containing chromium with a small percentage of carbon, and an overlying slag containing the oxides of iron and chromium. With the continued application of power, the temperature of the bath of molten metal and the supernatant slag is brought up to a point considerably higher than that ordinarily employed in usual steel melting practice in an electric furnace.

While no reliable method is known for precisely determining the temperature of the metal bath beneath the slag blanket, it is estimated that this temperature, designated as a temperature of superheat, is approximately 3000° F. to 3200° F., which is some 100° F. to 300° F. higher than the temperature ordinarily employed in electric steel melting practice. At this temperature of superheat the oxidizing slag is more active in combining with carbon contained in the metal bath and carbon coming from the furnace atmosphere, to effectively remove and/or exclude carbon from the metal bath.

Incidental to the oxidation of carbon, there is an oxidation of chromium from the bath, the chromium oxide entering the slag. The extent of the loss of chromium into the slag is minimized by the rapidity of the initial melt-down and bringing the bath and slag to the elevated temperature of superheat indicated above.

Under the strongly oxidizing action of the slag overlying the metal bath the carbon content is continuously lowered. When tests on samples taken from the bath indicate a desired low carbon content is reached (about .05%) the melt-down and oxidizing stage is at an end.

In order to effect a recovery of the metals contained in the slag as oxides of iron and chromium, there is added, illustratively, 1400 pounds of crushed 75% ferrosilicon and 4500 pounds of hot dry burnt lime as rapidly as furnace conditions permit. The additions of ferrosilicon and lime fuse and become incorporated in the slag and effect a reduction of the oxides of iron and chromium contained therein, producing metal, which goes into the underlying bath of molten metal and various silicates which remain in the slag and tend to render the slag acid. A basic character is obtained by the introduction of the large quantities of lime indicated above.

In order to efficiently and economically achieve a desired nitrogen content in the tapped metal, nitrogen gas is introduced into the slag overlying the metal bath immediately after the addition of ferrosilicon and lime is commenced. During the reduction of the oxides of iron and chromium contained in the slag, nascent iron and chromium metals form, and gravitate through the slag and into the underlying bath of metal. These metals in their nascent state actively absorb nitrogen and carry this nitrogen into the bath of molten metal.

The nitrogen gas is introduced directly into the slag within those regions where the reduction of the oxides contained in the slag is most actively going on, ordinarily within the regions of the slag immediately adjacent the electrodes.

For the proportions of the ingredients illustratively set forth above, a nitrogen content in the finished metal of about .05% is attained by passing a gentle flow of nitrogen gas into the slag through a ¼ inch pipe for a period of from 10 to 15 minutes. Commercial bottled dry nitrogen is an available and relatively inexpensive source of nitrogen gas which lends itself to an ease of operation and precise control.

As the lime and ferrosilicon are added to the slag the oxides contained therein are progressively reduced and the color of the slag changes from black to a light green. The reducing action is accompanied by a transfer of the metal from the slag to the underlying bath of molten iron and chromium. When the color of the slag indicates that substantially all of the oxide content has been reduced, this slag is preferably completely removed from the surface of the metal bath and a basic finishing slag of lime, ferrosilicon, and fluorspar or like flux, is formed in accordance with standard practice.

Final additions of lump low-carbon ferrosilicon and low-carbon ferromanganese are added to adjust the analysis of the bath to the desired specifications of silicon and manganese. Additions of the supplementary alloying elements, nickel, copper, cobalt, titanium, tungsten, vanadium, and the like are made as desired.

The heat of metal is then tapped into suitable molds and allowed to cool. The tapped metal, for the embodiment illustratively set forth above, weighs 17,300 pounds and analyzes about .08% carbon, 17% chromium, .06% nitrogen, .40% manganese, .35% silicon, with the desired supplementary alloy additions indicated above, with the usual low percentages of sulphur and phosphorus, and the balance substantially iron.

Thus it will be seen that there has been provided in this invention an art in which the various objects hereinbefore noted together with many thoroughly practical advantages are successfully achieved. It will be seen that the process of producing rustless irons and steels of a desired nitrogen content is simple, direct, and economical and that a desired nitrogen content may be efficiently and economically attained with a minimum of effort and/or expensive equipment.

While in the embodiment of my invention illustratively set forth above a bath of ferrous metal containing chromium covered by a slag containing oxides of iron and chromium is prepared by melting down a charge of rustless iron scrap, ordinary low-carbon steel scrap, chrome ore and mill scale (and the oxide content of this slag is reduced in the presence of nitrogen to effect a recovery of iron and chromium and add nitrogen to the bath), it will be understood that any desired raw materials such as ordinary scrap and/or rustless iron scrap, high-carbon ferrochrome and iron oxide may be melted down to form a bath of metal containing iron and chromium covered by a supernatant slag containing oxides of iron and chromium and these oxides reduced in the immediate presence of nitrogen to effect a recovery of the metals, and give a desired nitrogen content to the metal, where such procedure is found desirable.

Likewise, while in the embodiment illustratively set forth above, all of the chrome ore is added along with the initial charge of ingredients it will be understood that, where furnace operating conditions warrant it, a portion of the chrome ore may be added after the initial melt-down or even along with the reducing agent, ferrosilicon, and lime.

Although best results in the introduction of nitrogen are achieved by directly adding dry nitrogen to those regions of the slag where the reduction operation is most actively carried out, good results are achieved where nitrogen is forced into the slag from above, as by maintaining a nitrogen containing atmosphere within the furnace immediately above the slag at a slight pressure.

As many possible embodiments may be made of my invention and as many changes in the embodiment hereinbefore set forth it will be understood that all matter described herein is to be interpreted as illustrative, and not in a limiting sense.

I claim:

1. In the production of nitrogen-containing rustless iron and steel of fine grain structure, the art which includes, preparing a bath of molten iron and an overlying slag containing oxides of chromium, reducing the oxides of chromium contained in said slag thereby enriching said bath, and adding nitrogen to said slag during said reducing operation whereby considerable quantities of nitrogen are absorbed by the nascent chromium, thereby supplying appreciable quantities of nitrogen to said bath.

2. In the production of nitrogen-containing rustless iron and steel of fine grain structure, the art which includes, preparing a bath of molten iron and an overlying slag containing oxides of iron and chromium, and while reducing said oxides bubbling nitrogen gas into and through said slag whereby considerable quantities of nitrogen are absorbed by the iron and chromium coming from said slag and entering the bath of metal, thereby supplying appreciable quantities of nitrogen to said bath.

3. In the production of nitrogen-containing rustless iron and steel of fine grain structure, the art which includes, preparing a bath of molten iron and an overlying slag containing oxides of iron and chromium, reducing said oxides thereby enriching said bath, and passing nitrogen containing gas into the slag during said reducing operation whereby nitrogen is absorbed by the iron and chromium coming from said slag and entering the bath of metal, thereby supplying appreciable quantities of nitrogen to said bath.

4. In the production of nitrogen-containing rustless iron and steel of fine grain structure, the art which includes, preparing a bath of molten iron; adding chrome ore and a reducing agent to said bath whereby the ore is reduced, the chromium entering the bath; and supplying nitrogen to said ore during the reduction thereof, the nitrogen being absorbed by the nascent chromium, whereby nitrogen is added to said bath.

5. In the production of nitrogen-containing rustless iron and steel of fine grain structure, the art which includes, melting down a charge of rustless iron scrap, chrome ore and iron oxide to form a bath of metal covered by an oxidizing slag; maintaining said bath and slag at high temperature thereby oxidizing carbon from the bath together with chromium, the chromium oxide entering the slag; and while reducing the oxides in said slag bubbling nitrogen gas into the slag, the resulting metals absorbing nitrogen and thereby adding nitrogen to said bath along with the contributions from the slag.

6. In the production of nitrogen-containing rustless iron and steel of fine grain structure, the art which includes, preparing a bath of molten iron and an overlying slag containing oxides of chromium, reducing the oxides of chromium contained in the slag under strongly basic conditions thereby enriching said bath, and adding nitrogen to said slag during said basic reduction period whereby considerable quantities of nitrogen are absorbed by the nascent chromium, thereby supplying appreciable quantities of nitrogen to said bath.

WILLIAM BELL ARNESS.